United States Patent
Sung

(10) Patent No.: US 9,159,136 B2
(45) Date of Patent: Oct. 13, 2015

(54) TEMPORAL SMOOTHING APPARATUS AND METHOD FOR SYNTHESIZING INTERMEDIATE IMAGE

(75) Inventor: Jun-ho Sung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2785 days.

(21) Appl. No.: 10/964,775

(22) Filed: Oct. 15, 2004

(65) Prior Publication Data
US 2005/0105610 A1    May 19, 2005

(30) Foreign Application Priority Data
Nov. 13, 2003 (KR) .................................. 2003-80097

(51) Int. Cl.
| H04N 7/12 | (2006.01) |
| H04N 11/02 | (2006.01) |
| H04N 11/04 | (2006.01) |
| G06T 7/00 | (2006.01) |
| G06T 5/50 | (2006.01) |
| G06T 5/00 | (2006.01) |
| H04N 7/01 | (2006.01) |

(52) U.S. Cl.
CPC ............... *G06T 7/0065* (2013.01); *G06T 5/002* (2013.01); *G06T 5/50* (2013.01); *G06T 7/0022* (2013.01); *G06T 2207/10024* (2013.01); *G06T 2207/20182* (2013.01); *H04N 7/014* (2013.01)

(58) Field of Classification Search
USPC .............. 375/240.24, 240.01, 240.26, 240.25
See application file for complete search history.

(56) References Cited

U.S. PATENT DOCUMENTS
6,233,008 B1 * 5/2001 Chun ............................ 348/170
6,314,211 B1 * 11/2001 Kim et al. .................... 382/285

OTHER PUBLICATIONS

A. Mancini, "Robust Quadtree-based Disparity Estimation for the Reconstruction of Intermediate Steroescopic Images", USA SPIE, Jan. 1998.*
Jens-Rainer Ohm et al, "An Object-Based System for Stereoscopic Viewpoint Synthesis", IEEE Transactions on Circuits and Systems for Video Technology, vol. 7, No. 5, Oct. 1997, pp. 801-811.

* cited by examiner

*Primary Examiner* — Geepy Pe
(74) *Attorney, Agent, or Firm* — Sughrue Mion, PLLC

(57) ABSTRACT

A temporal smoothing apparatus and method for synthesizing an intermediate image, the apparatus including a disparity vector estimator which receives a previous image and a present images and generates a previous disparity vector and a present disparity vector for every image block of a predetermined size, and a temporal smoothing unit which receives the previous and present images and the previous and present disparity vectors and generates a temporally-smoothed disparity vector. The temporal smoothing unit generates a distinct temporally-smoothed disparity vector for each frame on the basis of a mean absolute difference (MAD) between the previous image and the present image, so that a flickering phenomenon of an intermediate image can be removed without deterioration of image quality by adaptively performing a temporal smoothing process in accordance with types of an image.

34 Claims, 8 Drawing Sheets

TEMPORAL SMOOTHING APPARATUS AND METHOD FOR SYNTHESIZING INTERMEDIATE IMAGE

This application claims the priority of Korean Patent Application No. 2003-80097, filed on Nov. 13, 2003, in the Korean Intellectual Property Office, the disclosure of which is incorporated herein in its entirety by reference.

BACKGROUND OF THE INVENTION

1. Field of the Invention

The present invention generally relates to a temporal smoothing apparatus and method for synthesizing an intermediate image, and more specifically, to a temporal smoothing apparatus and method capable of adaptively adjusting contribution degrees of a previous image and a present image in accordance with the types of an image to synthesize an intermediate image.

2. Description of the Related Art

To present more realistic images, image display systems such as televisions require three-dimensional image rendering devices and image processors. Three-dimensional display technologies can be largely classified into optical approaches and image-processing approaches. Specifically, the three-dimensional image processing field has been developed focusing on compression, decompression, transmission, and synthesis of image signals. Currently, a stereo (two viewpoints) technology to be applied to the simplest three-dimensional data terminals is employed in the game industry or the medical industry, and a three-dimensional broadcasting system employing the stereo technology has been realized in Japan and other countries.

FIG. 1 is a diagram schematically illustrating a three-dimensional image processing method. The three-dimensional image processing method includes: taking images of an object from various viewpoints and compressing the images into a predetermined image format; receiving and decompressing the compressed images and synthesizing an intermediate image from the images of various viewpoints, converting the transmitted images taken from various viewpoints and the synthesized intermediate image into a format which can be processed by a display apparatus; and finally providing a three-dimensional image to a, viewer by combining and displaying the images taken from various viewpoints.

A multi viewpoint three-dimensional image display apparatus requires images acquired from many viewpoints, but only images acquired from limited viewpoints are used due to band restriction. For this reason, the viewer feels as if he/she watches the images from a fixed specific position. In order to solve this problem, an intermediate image synthesizing technology to synthesize an intermediate image from images acquired by multi viewpoint cameras is employed. Such an intermediate image synthesizing technology is described in detail in the paper, "An Object-based System for Stereoscopic Viewpoint Synthesis" by J_R. Ohm, IEEE Trans. Circuit and System for Video Tech. Vol. 7, No. 5, pp. 801-811 October 1997, and the paper, "Robust Quadtree-based Disparity Estimation for the Reconstruction of Intermediate Stereoscopic Images" by A. Mancini, San Jose, USA SPIE, January 1998.

When the intermediate image is synthesized using the intermediate image synthesizing technology, a parallax estimation error between frames can occur due to noise or minute camera jerks. The parallax estimation error can occur in edges of the object in the synthesized intermediate image, and is observed as a flickering phenomenon by the viewer. Temporal smoothing technologies are used for removing the flickering phenomenon.

FIG. 2 is a diagram illustrating a conventional temporal smoothing technology. An intermediate image is generated from two images, i.e., a left image and a right image. A left disparity vector estimator 210 generates left disparity vectors 221 and 222 corresponding to a left image $LI_{T-1}$ 211 at a previous time T−1 and a left image $LI_T$ 212 at a present time T. A disparity vector indicates a range in which a specific image block in a target image is moved with respect to a reference image. That is, the left disparity vector indicates a range in which an image block of a predetermined size in the left image is moved with respect to the right image.

A left temporal smoothing unit 220 generates a smoothed disparity vector 231 from the generated previous and present left disparity vectors 221 and 222. The smoothed disparity vector is a value obtained by adding the present disparity vector to the previous disparity vector, and indicates an accumulated displacement value in which the specific image block in the left image is moved with respect to the right image. A left disparity vector (DV) densifying unit 230 generates a left pixel disparity vector 232 by scaling every pixel of the generated left disparity vector.

The right disparity vector is generated in the same manner as the left disparity vector. That is, a pixel disparity vector 237 of the right image is generated with reference to the right image through a right disparity vector estimator 215, a right temporal smoothing unit 225, and a right disparity vector densifying unit 235. The right disparity vector estimator 215 generates right disparity vectors 226 and 227 corresponding to a right image $RI_{t-1}$ 217 at a previous time T−1 and a right image $RI_T$ 216 at a present time T. The right temporal smoothing unit 225 generates a smoothed disparity vector 236 from the generated previous and present right disparity vectors 226 and 227. The right disparity vector (DV) densifying unit 235 generates the right pixel disparity vector 237 by scaling every pixel of the generated right disparity vector.

A disparity vector mapping unit 240 generates a mapped disparity vector 241 from the left and right pixel disparity vectors 232 and 237. The mapped disparity vector 241 is a final disparity vector used for synthesizing an intermediate image. The disparity vector mapping unit 240 generates the intermediate image disparity vector 241 by checking a consistency between the left and right pixel disparity vectors and then performing a re-scaling process on the basis of only the consistent disparity vector. An intermediate viewpoint reconstructing unit (IVR) 250 generates the intermediate image 251 from the intermediate image disparity vector 241 and the left and right images 212, 216.

However, the conventional temporal smoothing technology performs the temporal smoothing process uniformly regardless of the type of image. As a result, when a moving picture is static or when a static object exists in the moving picture, the temporal smoothing process is performed smoothly, while when the moving picture is dynamic, the temporal smoothing process may synthesize an unreasonable intermediate image.

SUMMARY OF THE INVENTION

To address the above problems of the conventional arrangement, an exemplary aspect of the present invention provides a method of and an apparatus for synthesizing an intermediate image, in which a flickering phenomenon of the intermediate image can be removed without deteriorating the image quality by adaptively performing a temporal smoothing process in accordance with the types of an image.

Accordingly, in an exemplary embodiment of the present invention, there is provided a temporal smoothing apparatus for synthesizing an intermediate image, the apparatus comprising: a disparity vector estimator which receives a previous image and a present image and generates a previous disparity vector and a present disparity vector every image block of a predetermined size; and a temporal smoothing unit which receives the previous and present images and the previous and present disparity vectors and generates a temporally-smoothed disparity vector, wherein the temporal smoothing unit generates a distinct temporally-smoothed disparity vector for each frame on the basis of a mean absolute difference (MAD) between the previous image and the present image.

The temporal smoothing unit may comprise: a correlator which generates a temporal smoothing coefficient C on the basis of the mean absolute difference between the previous image and the present image; and a smoothed disparity vector generator which receives the previous and present disparity vectors and generates the temporally-smoothed disparity vector, wherein the smoothed disparity vector generator adjusts contribution degree to the intermediate image of the previous disparity vector and the present disparity vector on the basis of the temporal smoothing coefficient.

Furthermore, the correlator may comprise: a mean absolute difference generator which receives the previous image and the present image, carries out a block matching process for every image block of the predetermined size, and then generates a mean absolute difference between level values of matched image blocks; and a temporal smoothing coefficient detector which detects the temporal smoothing coefficient by using a coefficient decision function for matching a temporal smoothing coefficient in accordance with the generated mean absolute difference.

Furthermore, according to another exemplary embodiment of the present invention, there is provided an apparatus for synthesizing an intermediate image, the apparatus comprising: a left (or right) disparity vector estimator which generates left previous and present disparity vectors (or right previous and present disparity vectors) from left previous and present images (or right previous and present images) extracted from a left (or right) image source; a left (or right) temporal smoothing unit which receives the left previous and present images (or the right previous and present images) and the left previous and present disparity vectors (or the right previous and present disparity vectors), and generates a left (or right) smoothed disparity vector; a left (or right) disparity vector densifying unit which generates a left (or right) pixel smoothed disparity vector by scaling the left (or right) smoothed disparity vector every pixel; a disparity vector mapping unit which receives the left and right scaled pixel disparity vectors, checks consistency between the left and right pixel disparity vectors, and generates a final disparity vector by removing the pixel disparity vectors not consistent with each other and then performing a scaling process by using the pixel disparity vectors consistent with each other; and an intermediate image reconstructing unit which generates an intermediate image by applying the final disparity vector to the left and right present images.

According to yet another exemplary embodiment of the present invention, there is provided a temporal smoothing method for synthesizing an intermediate image, the method comprising: (a) receiving a previous image and a present image and generating a previous disparity vector and a present disparity vector every image block of a predetermined size; and (b) receiving the previous and present images and the previous and present disparity vectors and generating a temporally-smoothed disparity vector, wherein in (b), a distinct temporally-smoothed disparity vector for each frame is generated on the basis of a mean absolute difference (MAD) between the previous image and the present image.

According to still yet another exemplary embodiment of the present invention, there is provided a method of synthesizing an intermediate image, the method comprising: (a) generating left previous and present disparity vectors (or right previous and present disparity vectors) from left previous and present images (or right previous and present images) extracted from a left (or right) image source; (b) receiving the left previous and present images (or the right previous and present images) and the left previous and present disparity vectors (or the right previous and present disparity vectors), and generating a left (or right) smoothed disparity vector; (c) generating a left (or right) pixel smoothed disparity vector by scaling the left (or right) smoothed disparity vector every pixel; (d) receiving the left and right pixel smoothed disparity vectors, checking a consistency between the left and right pixel disparity vectors, and generating a final disparity vector by removing the pixel disparity vectors not consistent with each other and then performing a scaling process by using the pixel disparity vectors consistent with each other; and (e) generating an intermediate image by applying the final disparity vector to the left and right present images.

BRIEF DESCRIPTION OF THE DRAWINGS

The above and other features and advantages of the present invention will become more apparent from detailed descriptions of exemplary embodiments thereof with reference to the accompanying drawings, in which.

DETAILED DESCRIPTION OF THE INVENTION

Figure 1:
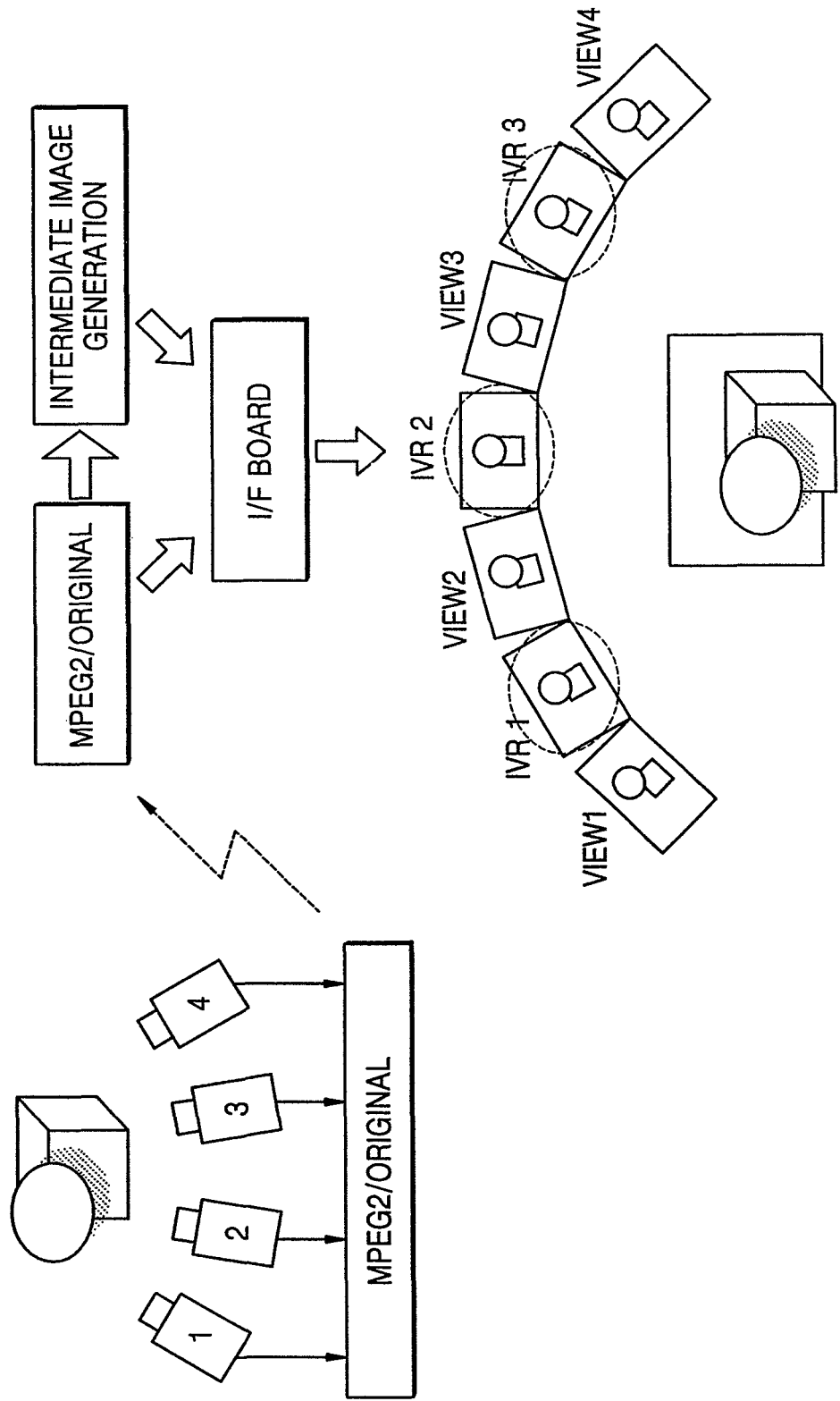
FIG. 1 is a diagram schematically illustrating a three-dimensional image processing.

The present invention and operational advantages thereof can be fully understood by referring to the attached drawings and explanations thereof.

Exemplary embodiments of the present invention will be described in detail with reference to the attached drawings. In the drawings, the same reference numerals indicate the same elements throughout.

Figure 3:
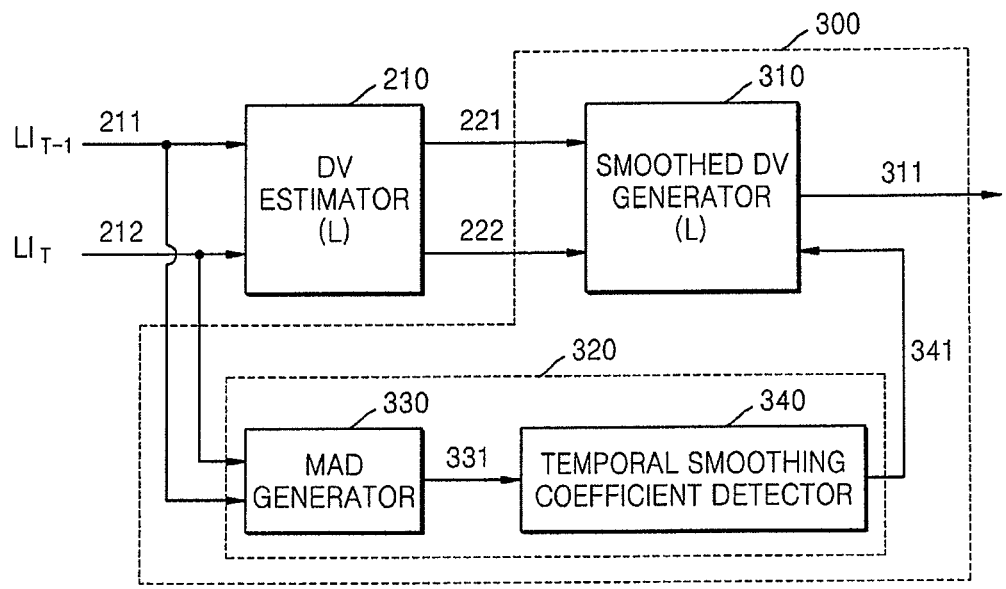
FIG. 3 is a block diagram illustrating an embodiment of generating a smoothed disparity vector according to the present invention.

FIG. 3 is a block diagram illustrating an embodiment of generating a smoothed disparity vector according to the present invention. A temporal smoothing unit 300 according to the present invention comprises a smoothed disparity vector generator 310 and a correlator 320.

Figure 4:
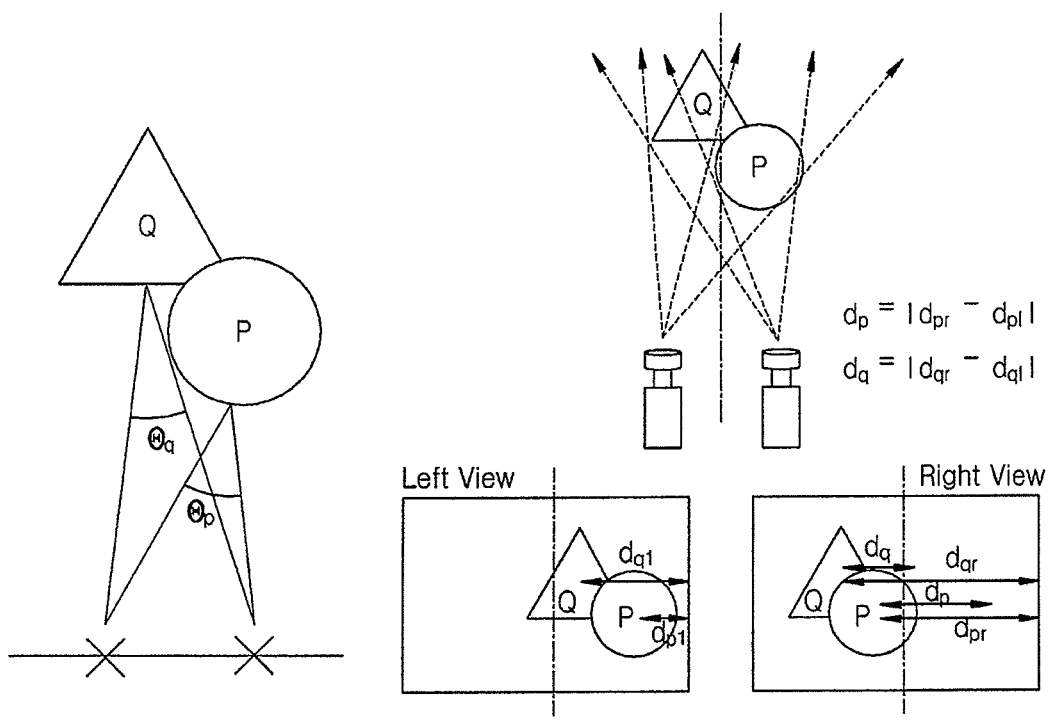
FIG. 4 is a diagram illustrating a disparity vector.

FIG. 4 is a diagram illustrating a disparity vector. A disparity vector estimator 210 generates previous and present disparity vectors 221 and 222 from a previous image 211 and a present image 212. The present disparity vector 222 indicates a distance by which a corresponding image block of a left (or right) present image is displaced with respect to the right (or left) present image.

In FIG. 4, objects Q and P are taken by two cameras. Due to positional difference of the two cameras, viewing angle differences $\theta_q$ and $\theta_p$ are generated. The viewing angle differences $\theta_q$ and $\theta_p$ are represented as "displacements" in the images taken by the respective cameras. In FIG. 4, the left image represents an image taken by the left camera, and the right image represents an image taken by the right camera. In the left image, the objects Q and P are biased to the right of the screen, while in the right image, the objects Q and P are biased to the left of the screen. A disparity vector is defined by Equation 1.

$$d_p = |d_{pr} - d_{pl}|$$
$$d_q = |d_{qr} - d_{ql}| \quad \text{(Equation 1)}$$

Here, $d_p$ and $d_q$ indicate disparity vectors of the objects P and Q, $d_{pr}$ and $d_{qr}$ indicate distances from a reference line of the right image, and $d_{pl}$ and $d_{ql}$ indicate distances from a reference line of the left image. As the reference line in FIG. 4, the right boundaries of the images are used.

A process of detecting where a specific area in the left (right) image is positioned in the right (left) image is required for generating the disparity vector. That is, it should be detected where the specific area having the same level value is positioned in the left image and the right image. A process of generating the disparity vector is divided into a block matching process and a disparity vector calculating process. Here, the specific area is defined as an "image block", which has a predetermined number of pixels. In an exemplary embodiment, the image block has 16×16 pixels.

Figure 5:
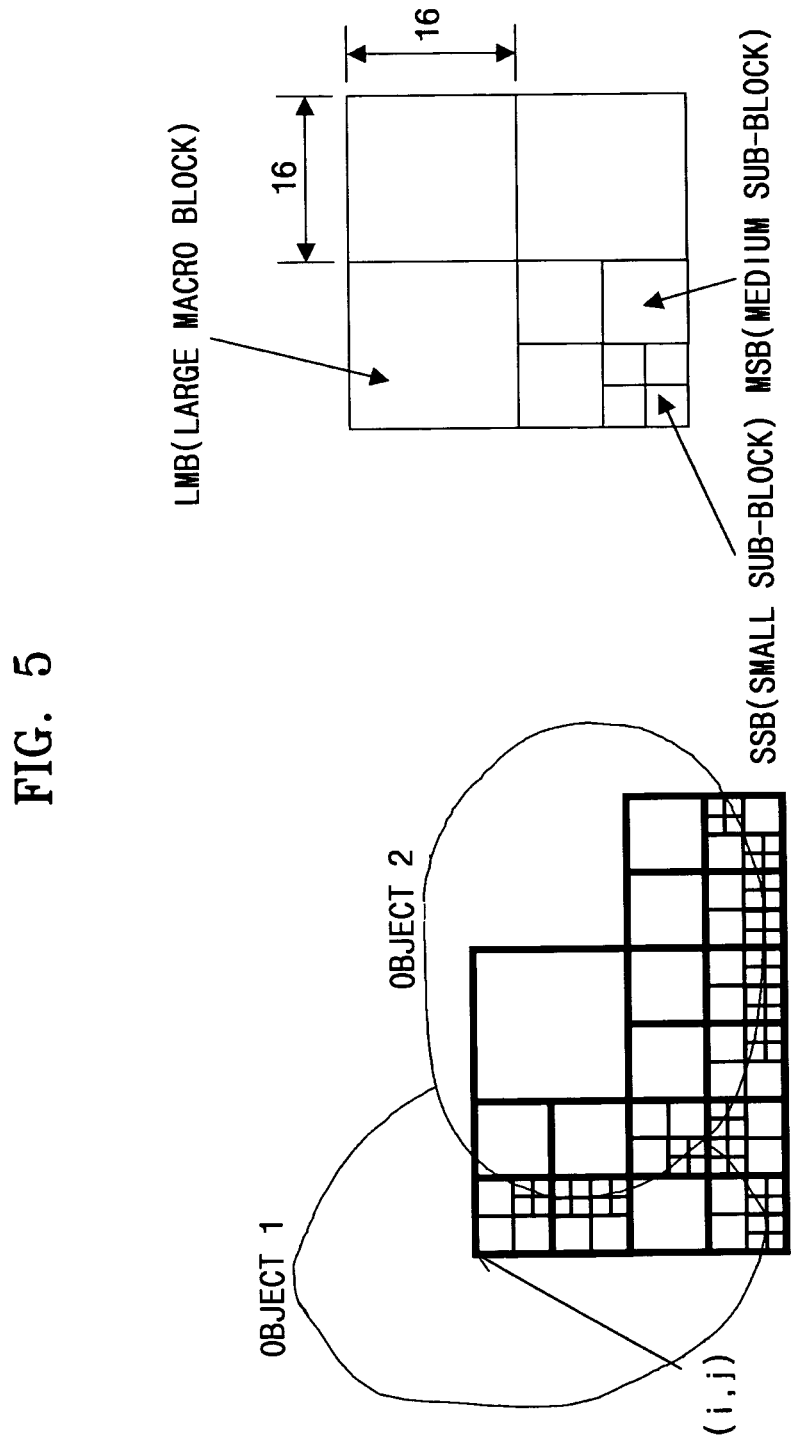
FIG. 5 is a diagram illustrating estimation of a disparity vector according to an embodiment of the present invention.

FIG. 5 illustrates a quadtree-based method and estimation of a disparity vector according to an embodiment of the present invention. In the quadtree-based method, the aforementioned image block is defined hierarchically. Quadtree-based methods are generally described in the paper published in 1987 by D. J. Vaisey and A. Gersho, entitled "Variable Block-Size Image Coding, Canada & USA", the paper published in 1990 by G. J. Sullivan and R. L. Baker, entitled "Efficient Quadtree Coding of Images and Video, UCLA, USA", and the paper published in 1998 by A. Mancini and K. Konrad, entitled "Robust Quadtree-based Disparity Estimation for Reconstruction of Intermediate Stereoscopic Images", INRS Telecom, Canada.

In the quadtree-based method in an embodiment of the present invention as shown in FIG. 5, one screen is divided into large macro blocks (LMBs), the macro block is divided into four medium sub-blocks (MSBs), and the medium sub-block is divided into four small sub-blocks (SSBs).

In general, since each small sub-block has 4×4 pixels, the medium sub-block has 8×8 pixels, and the large macro block has 16×16 pixels. First, the block matching process is carried out in a unit of large macro block. Then, if there exists a large difference in the mean absolute differences of the sub-blocks in the corresponding large macro block, then the block matching process is carried out in a unit of medium sub-block obtained by dividing the large macro block into four. At this time, if the same medium sub-block is detected, the block matching process is finished, and if there exists a large difference in the mean absolute differences of the sub-blocks in the corresponding medium sub-block, then the block matching process is carried out in a unit of small sub-block. Such a hierarchical block matching process has merits in that more accurate synthesized images can be obtained by carrying out the block matching process up to very small levels without a large increase in the amount of calculation.

According to an aspect of the present invention, the generated disparity vector may be input to the correlator 320 and used in an adaptive temporal smoothing process. The correlator 320 compares the left previous image 211 and the left present image 212 with each other, and checks whether the corresponding image is a dynamic moving picture or a static moving picture. The correlator 320 comprises a mean absolute difference (MAD) generator 330 and a temporal smoothing coefficient detector 340.

The MAD generator 330 carries out the block matching process between the left previous image 211 and the left present image 212, and then extracts MADs of level values of the matched blocks. A unit in which the block matching process is carried out depends upon requirements for hardware, and it is preferable that the block matching process is carried out in a unit of image block having 16×16 pixels. A large MAD value represents that the image is a dynamic moving picture. In a case of an RGB color scheme in which the block matching process is carried out in a unit of 16×16 pixels, the MAD values are obtained by Equation 2.

$$MAD(R) = \frac{1}{256} \sum_{k=0}^{255} |R(T) - R(T-1)| \quad \text{(Equation 2)}$$

$$MAD(G) = \frac{1}{256} \sum_{k=0}^{255} |G(T) - G(T-1)|$$

$$MAD(B) = \frac{1}{256} \sum_{k=0}^{255} |B(T) - B(T-1)|$$

$$MAD(T) = MAD(R) + MAD(G) + MAD(B)$$

Here, R(T), G(T) and B(T) indicate level values of R, G and B for a k-th pixel of the present image, respectively, R(T−1), G(T−1) and B(T−1) indicate level values of R, G and B for the k-th pixel of the previous image, respectively, MAD(R), MAD(G) and MAD(B) indicate MAD values of R, G and B, respectively, and MAD(T) indicates a total MAD value of the whole corresponding image block.

Furthermore, when the color scheme has 4:2:2 YUV, the MAD values can be defined by Equation 3.

$$MAD(Y) = \frac{1}{256} \sum_{k=0}^{255} |Y(T) - Y(T-1)| \quad \text{(Equation 3)}$$

$$MAD(U) = \frac{1}{128} \sum_{k=0}^{127} |U(T) - U(T-1)|$$

$$MAD(V) = \frac{1}{128} \sum_{k=0}^{127} |V(T) - V(T-1)|$$

$$MAD(T) = MAD(Y) + MAD(U) + MAD(V)$$

Here, Y(T), U(T) and V(T) indicate level values of Y, U and V for a k-th pixel of the present image, respectively, Y(T−1), U(T−1) and V(T−1) indicate level values of Y, U and V for the k-th pixel of the previous image, respectively, MAD(Y), MAD(U) and MAD(V) indicate MAD values of Y, U and V, respectively, and MAD(T) indicates a total MAD value of the whole corresponding image block.

Figure 6:
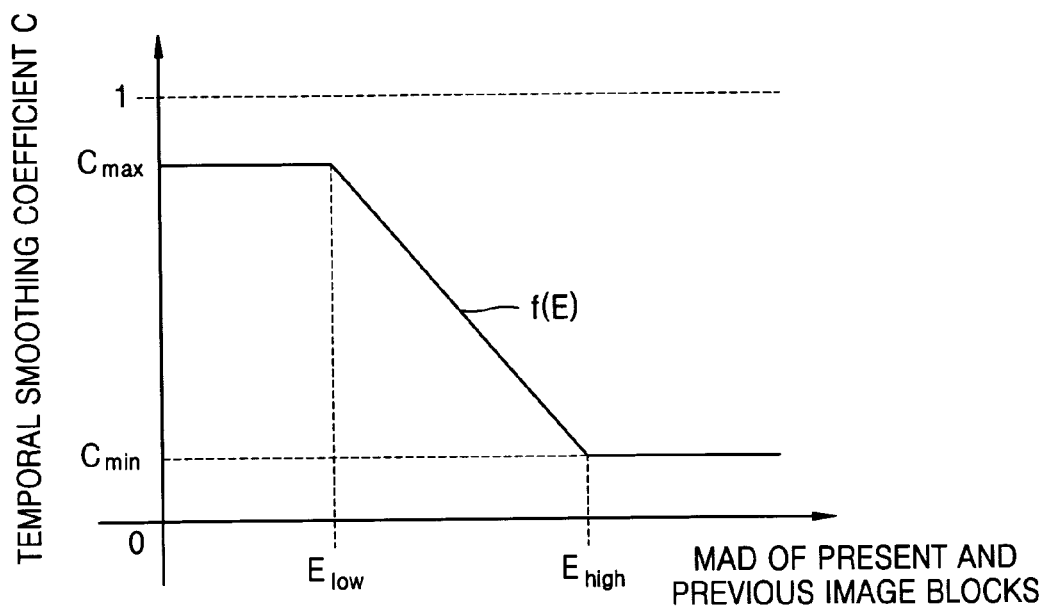
FIG. 6 is a diagram illustrating a principle for generating temporal smoothing coefficients.

FIG. 6 is a diagram illustrating a principle for generating temporal smoothing coefficients. The temporal smoothing coefficient detector 340 receives the MAD values from the MAD generator 330, and generates a temporal smoothing coefficient C 341 of the corresponding frame. The temporal smoothing coefficient 341 is a specific value determined every frame by comparing the previous image and the present image. According to an aspect of the present invention, a large temporal smoothing coefficient represents that the image is a static moving picture, and a small temporal smoothing coefficient represents that the image is a dynamic moving picture.

In FIG. 6, $E_{low}$ and $E_{high}$ indicate the minimum MAD value and the maximum MAD value, respectively, for the corresponding frame. Therefore, when level values used therein are 256, the maximum MAD value is 255 or less, and the minimum MAD value is 0 or more.

$C_{max}$ and $C_{min}$ indicate the maximum and minimum temporal smoothing coefficients, respectively. The maximum temporal smoothing coefficient is a temporal smoothing coefficient when the corresponding frame has the minimum MAD value. The maximum temporal smoothing coefficient is set by a user, and can be set to be different depending upon image types of a frame. As $C_{max}$ is set to be close to 1, a contribution degree of the previous image to the intermediate image is increased, so that as the image is closer to a static type, the maximum temporal smoothing coefficient has a value closer to 1.

If the generated MAD value 331 falls within a range of 0 through $E_{low}$, the temporal smoothing coefficient C 341 is fixed to $C_{max}$. Further, if the generated MAD value 331 is larger than $E_{high}$, the temporal smoothing coefficient C 341 is fixed to $C_{min}$. When the generated MAD value 331 falls within a range of $E_{low}$ through $E_{high}$, the temporal smoothing coefficient 341 is defined by a smoothing coefficient decision function $f(E)$. The temporal smoothing coefficient C 341 is represented by Equation 4.

$C=C_{max}$, if $E<E_{low}$ $C=f(E)$, if $E_{low} \leq E \leq E_{high}$ $C=C_{min}$, if $E>E_{high}$ (Equation 4)

The smoothing coefficient decision function $f(E)$ can be selected from functions in which the temporal smoothing coefficient and the MAD value are inversely proportional to each other. As a result, in a case of a static moving picture, a larger temporal smoothing coefficient can be selected. The smoothing coefficient decision function $f(E)$ may include a linear function, a quadratic function, a non-linear function non-linearly having saturation values at the maximum value and the minimum value, etc. In the embodiment shown in FIG. 6, a linear function is used as the smoothing coefficient decision function $f(E)$.

Figure 7:
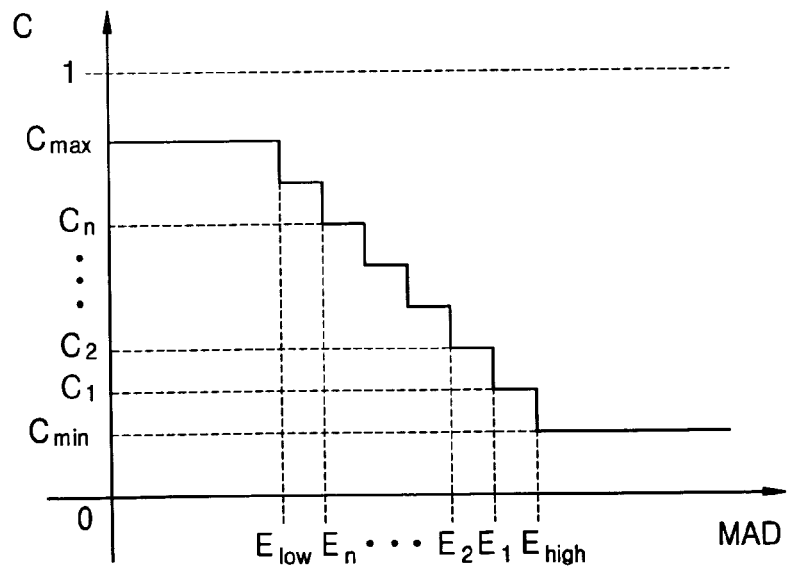
FIG. 7 is a diagram illustrating a decision function for the temporal smoothing coefficients according to an embodiment of the present invention.

FIG. 7 illustrates a smoothing coefficient decision function according to another embodiment of the present invention. As shown in FIG. 7, the smoothing coefficient decision function is a function of which an output value is a quantized value. The smoothing coefficient C is set to C1 if the MAD value falls within a range of E1 through E2, the smoothing coefficient C is set to C2 if the MAD value falls within a range of E2 through E3, . . . , and, the mapping process is repeated in this way. Such a smoothing coefficient decision function can be implemented by using a mapping table, etc., without using multiplication, so that it can be easily implemented using hardware.

The smoothed disparity vector generator 310 receives the temporal smoothing coefficient 341, the previous disparity vector 221 and the present disparity vector 222, and generates a smoothed disparity vector 311. According to an embodiment of the present invention, the smoothed disparity vector is generated by Equation 5.

$DV_{smoothed} = C \times DV_{previous} + (1-C) \times DV_{present}$ (Equation 5)

Here, $DV_{smoothed}$ indicates the smoothed disparity vector, $DV_{previous}$ indicates the previous disparity vector, $DV_{present}$ indicates the present disparity vector, and C indicates the temporal smoothing coefficient.

From Equation 5, it can be seen that as the temporal smoothing coefficient increases, the previous disparity vector is reflected more in the smoothed disparity vector. Therefore, the intermediate image synthesized by using the smoothed disparity vector includes the previous image more and more with increase of the temporal smoothing coefficient. Since the temporal smoothing coefficient is generated for each frame, the smoothed disparity vector has a distinct value for each frame, and the generated intermediate image has distinct contribution degrees of the previous image and the present image for each frame. Accordingly, the intermediate image can be synthesized adaptively.

In relation to FIGS. 3 through 7, a method and apparatus for generating the smoothed disparity vector has been described only for the left image, however, the smoothed disparity vector for the right image is generated in a similar manner.

Figure 2:
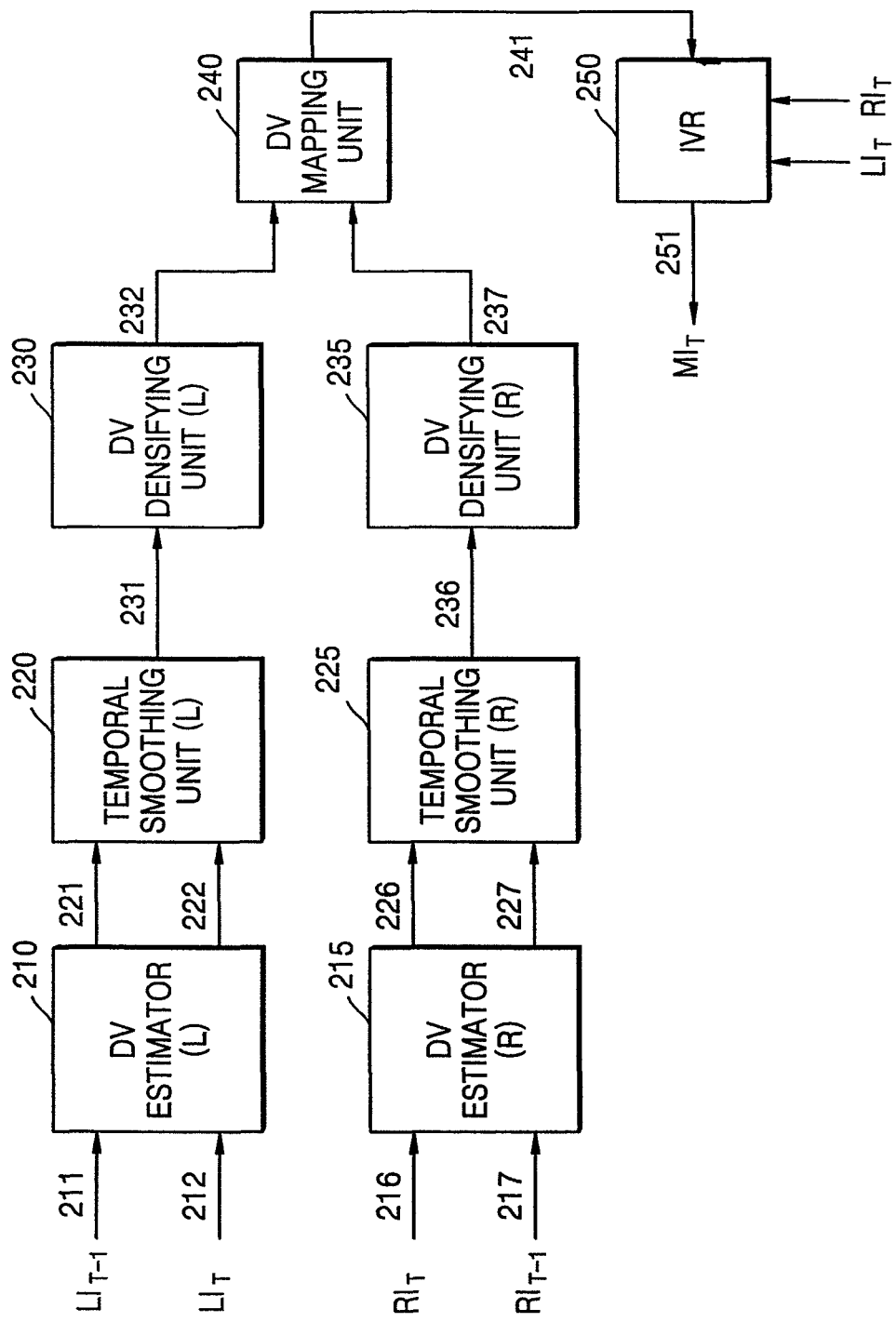
FIG. 2 is a block diagram illustrating a conventional temporal smoothing circuit.

Operation of the disparity vector (DV) densifying units 230, 235, the DV mapping unit 240 and the intermediate image reconstructing unit 250 is similar to operation in FIG. 2.

The DV densifying units 230, 235 receive the smoothed disparity vectors 231, 236 and generate the pixel disparity vectors 232, 237. The smoothed disparity vectors 231, 236 generated in the temporal smoothing unit are disparity vectors calculated in image blocks (SSB) having 4×4 pixels minimum. Therefore, in order to determine a level value for each pixel for synthesizing the intermediate image, it is necessary to densify the disparity vector every pixel. The densifying process is carried out by using a scaling method in which the disparity vectors for the blocks SSB, MSB, LSB are defined as both end values and new values as many as the number of pixels disposed between both end values. At this time, the new values are generally linear mean values.

The DV mapping unit 240 receives the left and right pixel disparity vectors 232, 237, and generates a final disparity vector 241. The DV mapping unit 240 checks consistency of the left and right pixel disparity vectors 232, 237, and removes the non-consistent disparity vectors. Next, the scaling process is carried out by using the remaining disparity vectors as both end values. Therefore, a new disparity vector 241 is generated every pixel with respect to the remaining disparity vectors.

The intermediate image reconstructing unit 250 receives the final disparity vector 241, the left image 212 and the right image 216, and generates the intermediate image 251. A process of reconstructing an intermediate viewpoint is used for reconstructing the intermediate image.

Figure 8:
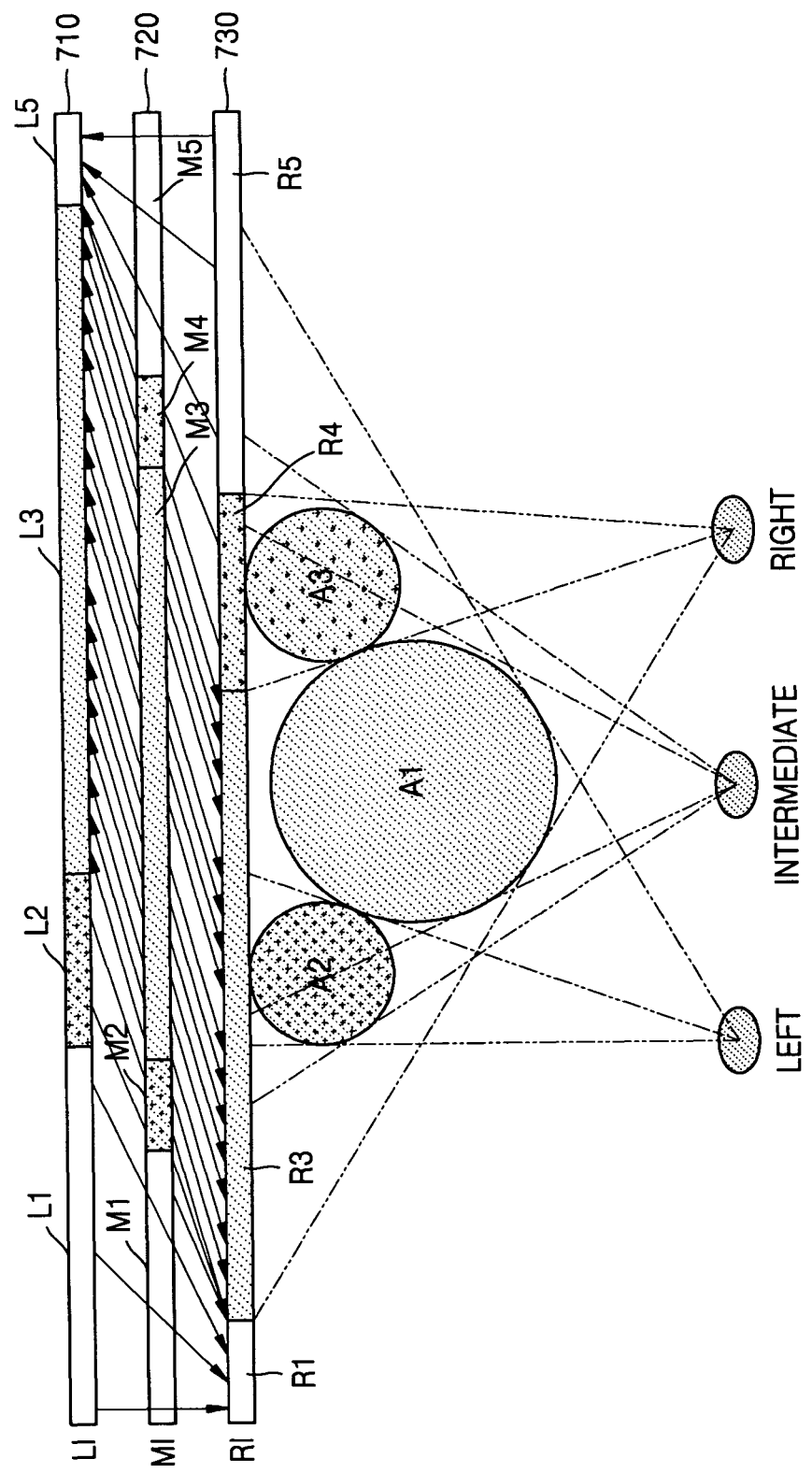
FIG. 8 is a diagram illustrating reconstruction of an intermediate viewpoint.

FIG. 8 illustrates reconstruction of an intermediate viewpoint. A left image LI 710 and a right image RI 730 indicate images obtained by taking a picture of objects A1, A2 and A3 from left and right viewpoints, respectively. The left image LI 710 comprises four sub-areas L1, L2, L3 and L5. The sub-areas L1 and L5 are background areas, the sub-area L2 is an area obtained by taking a picture of the object A2 from the left viewpoint, and the sub-area L3 is an area obtained by taking a picture of the object A1 from the left viewpoint. Since the object A3 is not visible from the left viewpoint, it is not displayed in the left image LI 710. The right image RI 730 comprises four sub-areas R1, R3, R4 and R5. The sub-areas R1 and R5 are background areas, the sub-area R3 is an area obtained by taking a picture of the object A1 from the right viewpoint, and the sub-area R4 is an area obtained by taking a picture of the object A3 from the right viewpoint. Since the object A2 is not visible from the right viewpoint, it is not displayed in the right image RI 730.

Arrows in FIG. 8 indicate disparity vectors. Since each disparity vector indicates a distance and a direction in which pixels included in each sub-area are moved, data representing which level values correspond to positions of the intermediate image MI 720 can be obtained from the disparity vector data. For example, since the sub-area L1 corresponds to the sub-area R1, a sub-area M1 of the intermediate image MI 720 can be generated from the sub-areas L1 and R1 and the final disparity vectors 241 for pixels included in the sub-areas L1 and R1. Similarly, since the sub-areas L3 and L5 correspond to the sub-areas R3 and R5, respectively, sub-areas M3 and M5 of the intermediate image MI 720 corresponding thereto can be generated.

Since the left image LI 710 has no data on the object A3, a sub-area M4 of the intermediate image corresponding to the object A3 is generated only by using the sub-area R4 of the right image RI 730 and the final disparity vectors of the sub-area R4. Similarly, since the right image RI has no data on the object A2, a sub-area M2 of the intermediate image MI 720 corresponding to the object A2 is generated only by using the sub-area L2 of the left area and the final disparity vectors of the sub-area L2.

Figure 9:
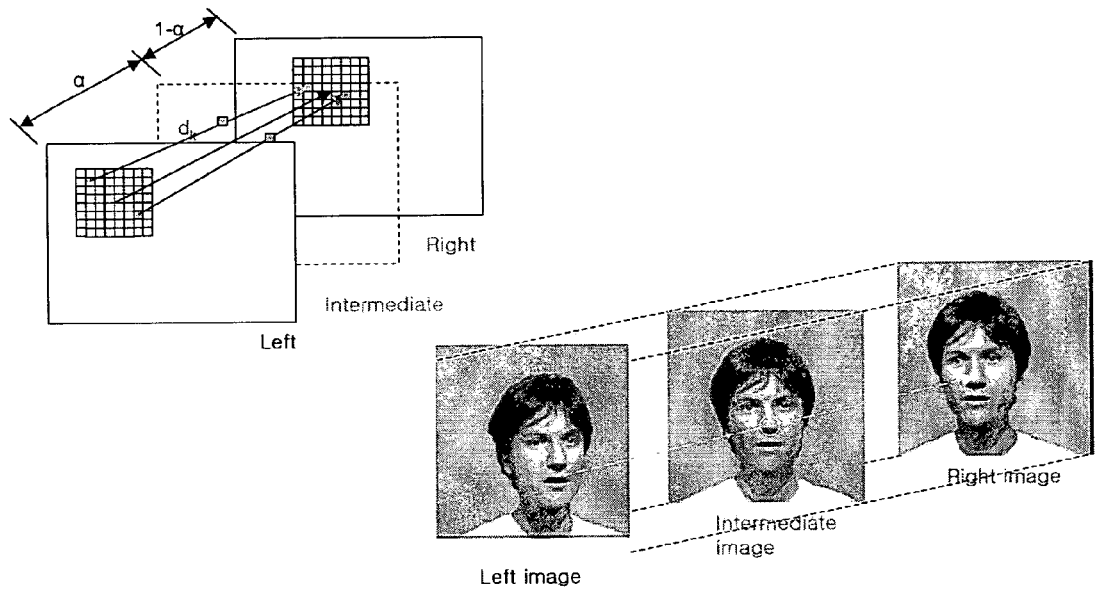
FIG. 9 is a diagram illustrating determination of level values of pixels of an intermediate image.

FIG. 9 illustrates determination of level values of pixels of the intermediate image. If positions corresponding to the pixels are determined in FIG. 8, it should be determined which level values are given to the positions for the intermediate image. The level values in an embodiment of the present invention are determined by Equation 6.

$$MI[x+\alpha \times d_k(x,y),y]=(1-\alpha)\times LI[x,y]+\alpha \times RI[x+d_k(x,y),y] \quad \text{(Equation 6)}$$

Here, LI, RI and MI indicate level values of the corresponding pixel in the left image, the right image and the intermediate image, respectively, $d_k(x,y)$ indicates a displacement of direction extracted from the disparity vector of the corresponding pixel, and $\alpha$ indicates an intermediate image synthesizing coefficient. In FIG. 9, since only movement in the right-left direction exists, only the displacement in the X direction is considered, and the equation is generated on the basis of coordinates of the left image.

The intermediate image synthesizing coefficient $\alpha$ indicates a ratio at which the level values of the left image and the right image are reflected in synthesizing the intermediate image. The intermediate image synthesizing coefficient $\alpha$ has a range of 0 through 1. If $\alpha=0.5$, it indicates a mean value between the level value of a corresponding pixel in the left image and the level value of the corresponding pixel in the right image. If $\alpha<0.5$, the level value of the corresponding pixel in the left image is more reflected in generating the level value of the corresponding pixel in the intermediate image, and if $\alpha>0.5$, it is opposite thereto.

The intermediate image synthesizing coefficient $\alpha$ determines the number of intermediate images to be reconstructed. If the number of intermediate images to be reconstructed is one or more, various intermediate images of various $\alpha$ values are reconstructed. That is, in order to reconstruct one or more intermediate images, the intermediate image is repeatedly reconstructed with change of $\alpha$ by the intermediate viewpoint reconstructing unit 250, and the previous actions need not be repeated.

Figure 10:
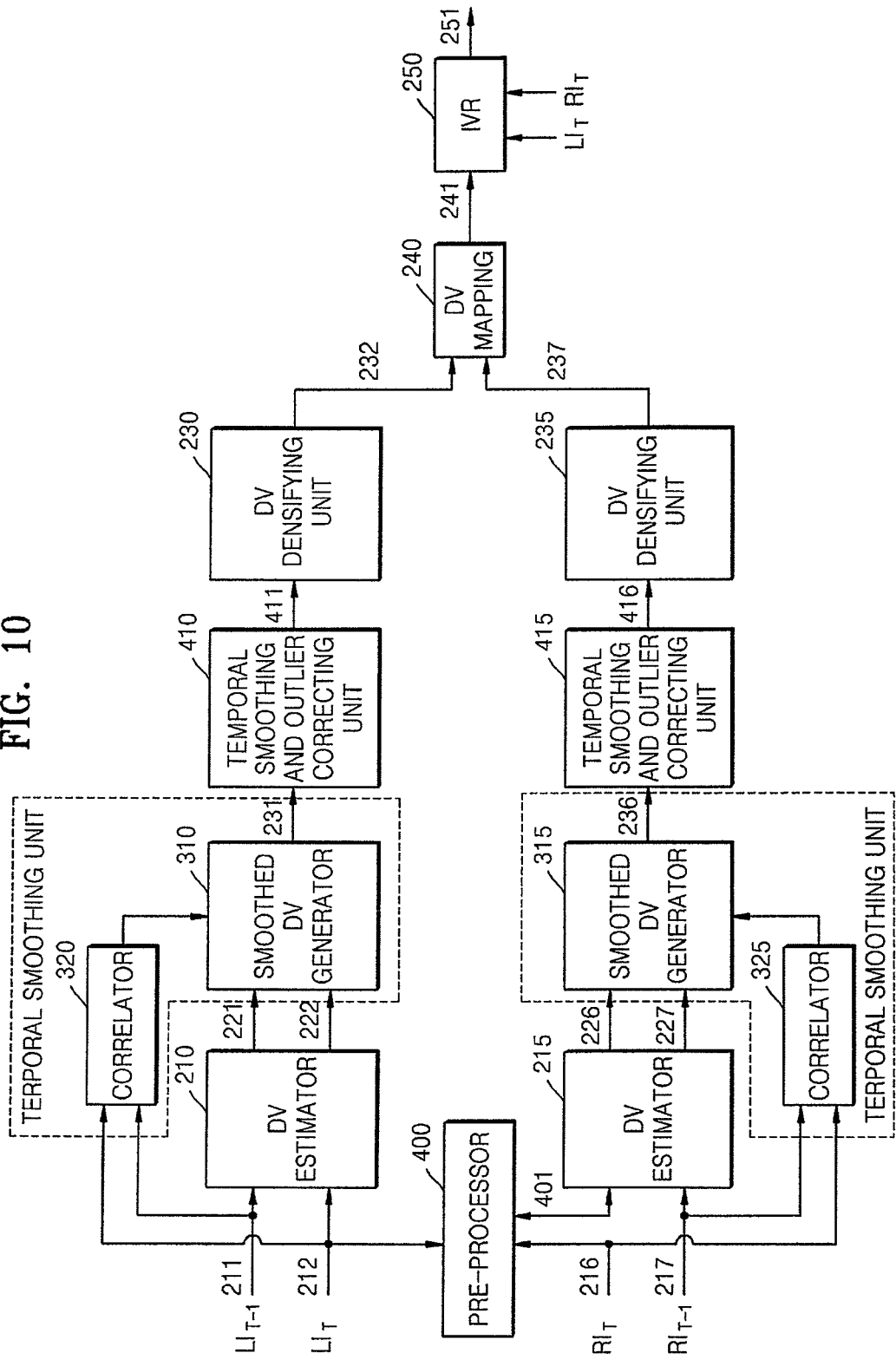
FIG. 10 is a diagram illustrating an embodiment of synthesizing an intermediate image according to the present invention.

FIG. 10 illustrates synthesizing the intermediate image according to another embodiment of the present invention. An apparatus for synthesizing an intermediate image according to an embodiment of the present invention further comprises a pre-processor 400. The pre-processor 400 is located only at one side of the left or right image processing units. In the embodiment shown in FIG. 10, the pre-processor 400 is located at the right image processing unit. The pre-processor 400 is positioned at a front stage of the disparity vector estimator 215.

Differences in brightness and color of the left and right image signals, which are caused due to difference in optical characteristics and a charge coupled device (CCD) of a stereo camera, result in distorted estimation of disparities. In order to remove the distortion, it is necessary that the brightness or color signals of one image are corrected on the basis of the other image.

For the correction, the pre-processor 400 receives the left and right present images $LI_T$ and $RI_T$, and generates a corrected right image $RI_T'$ 401. This correction is carried out by adjusting a gain and an offset of the brightness and color signals of an image. Here, the gain and the offset are extracted from a characteristic graph showing a distribution of level values in a specific line of an image. The adjustment of the gain and the offset can be represented by Equation 7.

$$RI_T'=G\times RI_T+F \quad \text{(Equation 7)}$$

Here, G and F are correction values for the gain and the offset of the right image on the basis of the left image, respectively.

An apparatus for synthesizing an intermediate image according to another embodiment of the present invention further comprises a spatial smoothing and outlier correcting units 410 and 415. The spatial smoothing and outlier correcting units 410 and 415 are positioned between the temporal smoothing units 310, 315 and the disparity vector densifying units 230, 235, respectively.

In the spatial smoothing process, when the smoothed disparity vectors 231, 236 generated for a specific block are excessively higher or lower than the smoothed disparity vectors for other blocks adjacent thereto, they are converted into proper values such as mean values, etc. The spatial smoothing process is generally carried out by using a median filter. In the outlier correcting process, by means of a filtering of removing the values exceeding a predetermined range of numerical values, erroneous disparity vectors generated in the image matching process is removed. Such spatial smoothing process and outlier correcting process are well known to those skilled in the art. Smoothed and corrected vectors 411 and 416 are output from the spatial smoothing and outlier correcting units 410 and 415 respectively.

As described above, according to the temporal smoothing apparatus and method of the present invention, a flickering phenomenon of an intermediate image can be removed without deterioration of image quality by adaptively performing a temporal smoothing process in accordance with types of an image.

While the present invention has been particularly shown and described with reference to exemplary embodiments thereof, it will be understood by those skilled in the art that various changes in form and details may be made therein without departing from the spirit and scope of the present invention as defined by the following claims.

What is claimed is:

1. A temporal smoothing apparatus for synthesizing an intermediate image from a first and a second image, the apparatus comprising:
 a disparity vector estimator which receives previous images and present images of the first image and the second image and generates a previous disparity vector and a present disparity vector for every image block of a predetermined size; and
 a temporal smoothing unit which receives the previous and present images of one image of the first image and the second image, and the previous and present disparity vectors of the one image, and generates a temporally-smoothed disparity vector of the one image,
 wherein the temporal smoothing unit generates the temporally-smoothed disparity vector of the one image by adjusting the previous and present disparity vectors of the one image on the basis of a mean absolute difference (MAD) between the previous image and the present image of the one image.

2. The apparatus according to claim 1, wherein the temporal smoothing unit comprises:
 a correlator which generates a temporal smoothing coefficient C on the basis of the mean absolute difference between the previous image and the present image of the one image; and
 a smoothed disparity vector generator which receives the previous and present disparity vectors and generates the temporally-smoothed disparity vector, and
 wherein the smoothed disparity vector generator adjusts contribution degree to the intermediate image of the previous disparity vector and the present disparity vector on the basis of the temporal smoothing coefficient.

3. The apparatus according to claim 2, wherein the correlator comprises:
 a mean absolute difference generator which receives the previous image and the present image of the one image, carries out a block matching process every image block of the predetermined size, and then generates a mean absolute difference between level values of matched image blocks; and
 a temporal smoothing coefficient detector which detects the temporal smoothing coefficient by using a coefficient decision function for matching a temporal smoothing coefficient in accordance with the generated mean absolute difference.

4. The apparatus according to claim 3, wherein the previous image and the present image of the one image have an RGB color scheme, and
 wherein the mean absolute difference generator generates the mean absolute difference on the basis of a mean value of differences between level values R(T), G(T) and B(T) for a k-th pixel of the present image of the one image and level values R(T−1), G(T−1) and B(T−1) for the k-th pixel of the previous image of the one image.

5. The apparatus according to claim 3, wherein the previous image and the present image of the one image have a YUV color scheme of 4:2:2, and
 wherein the mean absolute difference generator generates the mean absolute difference on the basis of a mean value of differences between level values Y(T), U(T) and V(T) for a k-th pixel of the present image and level values Y(T−1), U(T−1) and V(T−1) for the k-th pixel of the previous image.

6. The apparatus according to claim 3, wherein in the coefficient decision function, the mean absolute difference and the temporal smoothing coefficient are inversely proportional to each other.

7. The apparatus according to claim 6, wherein in the coefficient decision function, the mean absolute difference has a critical range, and the temporal smoothing coefficient has a constant value when the mean absolute difference exceeds the critical range.

8. The apparatus according to claim 7, wherein the coefficient decision function is a linear function.

9. The apparatus according to claim 7, wherein the coefficient decision function is a quadratic function.

10. The apparatus according to claim 7, wherein the coefficient decision function is a non-linear function having a saturation curve when the mean absolute difference exceeds the critical range.

11. The apparatus according to claim 7, wherein in the coefficient decision function, the mean absolute difference and the temporal smoothing coefficient have a quantized relation therebetween.

12. The apparatus according to claim 3, wherein the smoothed disparity vector generator generates the smoothed disparity vector such that the larger the temporal smoothing coefficient is, the larger the contribution degree of the previous disparity vector is.

13. The apparatus according to claim 12, wherein the smoothed disparity vector generator generates the smoothed disparity vector by using the equation:

$$DVsmoothed = C \times DVprevious + (1-C) \times DVpresent,$$

where DVsmoothed indicates the smoothed disparity vector, DVprevious indicates the previous disparity vector, DVpresent indicates the present disparity vector, and C indicates the temporal smoothing coefficient.

14. An apparatus for synthesizing an intermediate image, the apparatus comprising:
 a left disparity vector estimator which generates left previous and present disparity vectors based on left previous and present images and right previous and present images extracted from left and right image sources;
 a right disparity vector estimator which generates right previous and present disparity vectors based on left previous and present images and right previous and present images extracted from left and right image sources;
 a left temporal smoothing unit which receives the left previous and present images and the left previous and present disparity vectors, and generates a left smoothed disparity vector by adjusting the left previous and present disparity vectors on the basis of a mean absolute difference (MAD) between the left previous and present images;
 a right temporal smoothing unit which receives the right previous and present images and the right previous and present disparity vectors, and generates a right smoothed disparity vector by adjusting the right previous and present disparity vectors on the basis of a mean absolute difference (MAD) between the right previous and present images;
 a left disparity vector densifying unit which generates a left pixel smoothed disparity vector by scaling the left smoothed disparity vector every pixel;
 a right disparity vector densifying unit which generates a right pixel smoothed disparity vector by scaling the right smoothed disparity vector every pixel;
 a disparity vector mapping unit which receives the left and right pixel disparity vectors, checks consistency between the left and right pixel disparity vectors, and generates a final disparity vector by removing the pixel disparity vectors not consistent with each other and then performing a scaling process by using the pixel disparity vectors consistent with each other; and an intermediate image reconstructing unit which generates an intermediate image by applying the final disparity vector to the left and right present images.

15. The apparatus according to claim 14, wherein each of the left temporal smoothing unit and the right temporal smoothing unit comprises:

a correlator which generates a temporal smoothing coefficient C on the basis of the mean absolute difference between a previous image and a present image of each image of left and right images; and a smoothed disparity vector generator which receives previous and present disparity vectors of the each image of left and right images and generates a temporally-smoothed disparity vector of the each image of left and right images, and wherein the smoothed disparity vector generator adjusts contribution degree to the intermediate image of the previous disparity vector and the present disparity vector on the basis of the temporal smoothing coefficient.

16. The apparatus according to claim 15, wherein each correlator comprises:

a mean absolute difference generator which receives the previous image and the present image, carries out a block matching process every image block of the predetermined size, and then generates a mean absolute difference between level values of matched image blocks; and a temporal smoothing coefficient detector which detects the temporal smoothing coefficient by using a coefficient decision function for matching a temporal smoothing coefficient in accordance with the generated mean absolute difference.

17. The apparatus according to claim 16, wherein in the coefficient decision function, the mean absolute difference has a critical range, and the temporal smoothing coefficient has a constant value when the mean absolute difference exceeds the critical range.

18. The apparatus according to claim 15, wherein each smoothed disparity vector generator generates the smoothed disparity vector by using the equation:

$$DVsmoothed = C \times DVprevious + (1-C) \times DVpresent,$$

where DVsmoothed indicates the smoothed disparity vector, DVprevious indicates the previous disparity vector, DVpresent indicates the present disparity vector, and C indicates the temporal smoothing coefficient.

19. The apparatus according to claim 16, wherein a preprocessor is further provided which receives the left and right present images and generates a corrected left or right present image by correcting level values of one of the left and right present images with respect to the other present image.

20. The apparatus according to claim 19, wherein the preprocessor generates the corrected left or right present image by adjusting a gain and an offset value with respect to the other present image.

21. The apparatus according to claim 16, wherein a spatial smoothing and outlier correcting unit is further provided which receives the left and right smoothed disparity vectors from the left and right temporal smoothing units and carries out a spatial smoothing and outlier correcting processes, respectively.

22. The apparatus according to claim 21, wherein the spatial smoothing process is carried out by using a median filter.

23. The apparatus according to claim 16, wherein the intermediate image reconstructing unit generates the intermediate image by carrying out an intermediate viewpoint reconstructing (IVR) process.

24. A temporal smoothing method for synthesizing an intermediate image from a first and a second image in a computer device comprising a processor having computer device-executable instructions, the method comprising:

(a) receiving previous images and present images of the first image and the second image and generating, using the processor, a previous disparity vector and a present disparity vector for every image block of a predetermined size; and (b) receiving the previous and present images of one image of the first image and the second image, and the previous and present disparity vectors, and generating, using the processor, a temporally-smoothed disparity vector of the one image, wherein in (b), the temporally-smoothed disparity vector for the one image is generated by adjusting the previous and present disparity vectors of the one image on the basis of a mean absolute difference (MAD) between the previous image and the present image of the one image.

25. The method according to claim 24, wherein (b) comprises:

(b-1) generating a temporal smoothing coefficient C on the basis of the mean absolute difference between the previous image and the present image of the one image; and (b-2) generating the temporally-smoothed disparity vector based on the previous and present disparity vectors, and wherein in (b-2), contribution degree to the intermediate image of the previous disparity vector and the present disparity vector are adjusted on the basis of the temporal smoothing coefficient.

26. The method according to claim 25, wherein (b-1) comprises:

(b-1-1) receiving the previous image and the present image of the one image, carrying out a block matching process every image block of the predetermined size, and then generating a mean absolute difference between level values of matched image blocks; and (b-1-2) detecting the temporal smoothing coefficient by using a coefficient decision function for matching a temporal smoothing coefficient in accordance with the generated mean absolute difference.

27. The method according to claim 26, wherein in the coefficient decision function, the mean absolute difference and the temporal smoothing coefficient are inversely proportional to each other.

28. The method according to claim 27, wherein in the coefficient decision function, the mean absolute difference has a critical range, and the temporal smoothing coefficient has a constant value when the mean absolute difference exceeds the critical range.

29. The method according to claim 28, wherein the coefficient decision function is a linear function.

30. The method according to claim 28, wherein the coefficient decision function is a non-linear function having a saturation curve when the mean absolute difference exceeds the critical range.

31. The method according to claim 28, wherein in the coefficient decision function, the mean absolute difference and the temporal smoothing coefficient have a quantized relation.

32. The method according to claim 25, wherein in (b-2), the smoothed disparity vector is generated such that as the temporal smoothing coefficient increases, the contribution degree of the previous disparity vector becomes larger.

33. The method according to claim 32, wherein in (b-2), the smoothed disparity vector is generated by using the equation:

$$DVsmoothed = C \times DVprevious + (1-C) \times DVpresent,$$

where DVsmoothed indicates the smoothed disparity vector, DVprevious indicates the previous disparity vector, DVpresent indicates the present disparity vector, and C indicates the temporal smoothing coefficient.

34. The apparatus according to claim 1, wherein previous and present images of the first image are previous and present left-eye images, respectively, and the previous and present images of the second image are corresponding previous and present right-eye images, respectively.

* * * * *